(12) United States Patent
Foti

(10) Patent No.: US 8,646,297 B2
(45) Date of Patent: Feb. 11, 2014

(54) DISC BRAKE LOCKS

(75) Inventor: Ivan Foti, Yua Ma Tei (HK)

(73) Assignee: Xena IP Holdings Limited, Tortola (VG)

( * ) Notice: Subject to any disclaimer, the term of this patent is extended or adjusted under 35 U.S.C. 154(b) by 354 days.

(21) Appl. No.: 12/669,458

(22) PCT Filed: May 12, 2008

(86) PCT No.: PCT/GB2008/001634
§ 371 (c)(1),
(2), (4) Date: May 12, 2010

(87) PCT Pub. No.: WO2009/010709
PCT Pub. Date: Jan. 22, 2009

(65) Prior Publication Data
US 2010/0212371 A1   Aug. 26, 2010

(30) Foreign Application Priority Data

Jul. 16, 2007   (GB) .................................. 0713779.7

(51) Int. Cl.
*B62H 5/00*    (2006.01)
*E05B 71/00*   (2006.01)

(52) U.S. Cl.
USPC .. 70/233; 70/32; 70/361; 70/451; 70/DIG. 49

(58) Field of Classification Search
USPC ............... 70/32–34, 361, 370, 371, 451, 233, 70/DIG. 49; 340/426.32, 453, 468, 479, 340/426.33, 432, 427, 542
See application file for complete search history.

(56) References Cited

U.S. PATENT DOCUMENTS

| 4,183,235 | A | * | 1/1980 | Coralli et al. | 70/34 |
| 5,365,758 | A | * | 11/1994 | Shieh | 70/33 |
| 5,379,618 | A | * | 1/1995 | Shieh | 70/33 |
| 5,388,436 | A | * | 2/1995 | Shieh | 70/226 |
| 5,442,941 | A | * | 8/1995 | Kahonen et al. | 70/34 |
| 5,467,618 | A | * | 11/1995 | Shieh | 70/33 |
| 5,492,206 | A | * | 2/1996 | Shieh | 70/33 |
| 5,499,518 | A | * | 3/1996 | Shieh | 70/233 |
| 5,507,160 | A | | 4/1996 | Shieh | |
| 5,515,947 | A | * | 5/1996 | Shieh | 70/32 |
| 5,517,837 | A | * | 5/1996 | Wang | 70/226 |
| 5,530,427 | A | * | 6/1996 | Shieh | 70/226 |

(Continued)

FOREIGN PATENT DOCUMENTS

| EP | 0 716 007 | 6/1996 |
| EP | 1 764 292 | 3/2007 |
| EP | 1 764 293 | 3/2007 |

*Primary Examiner* — Lloyd Gall
*Assistant Examiner* — David E Sosnowski
(74) *Attorney, Agent, or Firm* — Workmann Nydegger

(57) ABSTRACT

A disc brake lock used principally with motorcycles has a body (10) with a U-shaped slot (13) to receive an edge of the disc. A locking pin can be moved to extend through a hole in the disc to fix the lock to the disc. A limb (11) of the U-shaped body (10) that is on the outside when the lock is clamped to the disc contains an alarm system (14) housed in a chamber (28) that cannot be accessed through that limb. The other limb (12), which is between the disc and the wheel, contains a removable cover (34) that, for extra security, can only be opened when the locking pin (16) is retracted. The alarm system (14) is inserted into the chamber (28) through the other limb (12).

13 Claims, 3 Drawing Sheets

(56) References Cited

U.S. PATENT DOCUMENTS

Figure 1A:
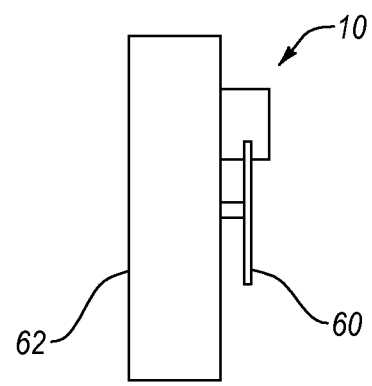

| | | | |
|---|---|---|---|
| 5,736,924 A | 4/1998 | Shieh | |
| 5,819,889 A * | 10/1998 | Shieh | 70/34 |
| 5,916,279 A * | 6/1999 | Shieh | 70/33 |
| 5,931,035 A * | 8/1999 | Bolton | 70/367 |
| 5,964,107 A * | 10/1999 | Chang | 70/33 |
| 5,987,939 A * | 11/1999 | Pitisettakarn | 70/33 |
| 6,145,351 A * | 11/2000 | Levenson | 70/93 |
| 6,553,793 B1 * | 4/2003 | Chen | 70/33 |
| 7,281,400 B2 * | 10/2007 | Muerza | 70/233 |
| 7,316,302 B2 * | 1/2008 | Hogesta | 70/233 |
| 7,752,874 B2 * | 7/2010 | Foti | 70/33 |
| 2003/0188938 A1* | 10/2003 | Li | 188/265 |

\* cited by examiner

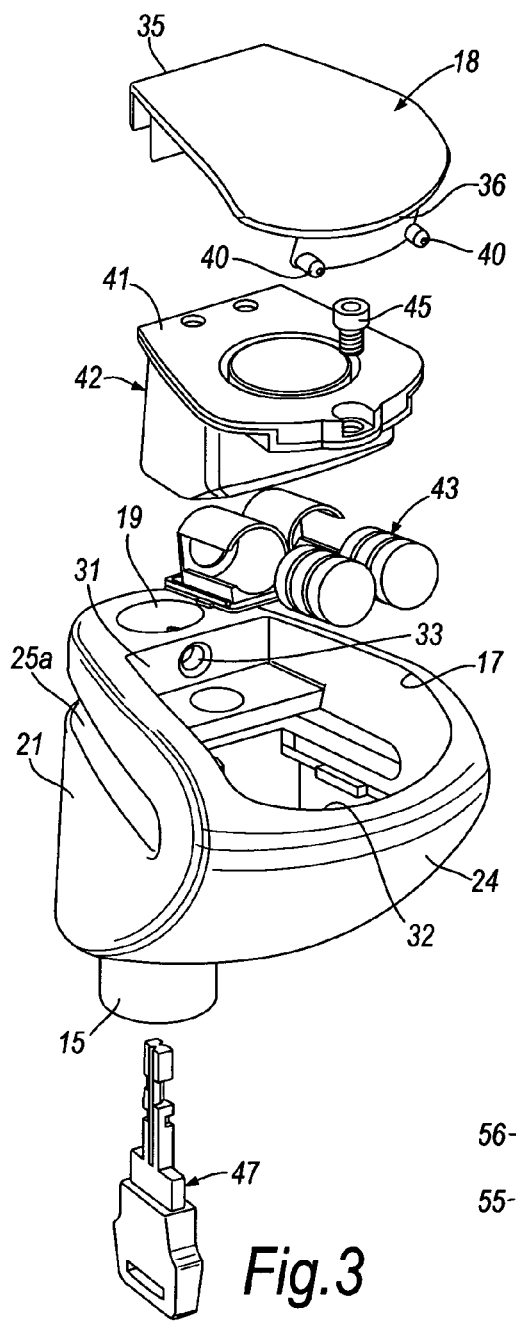
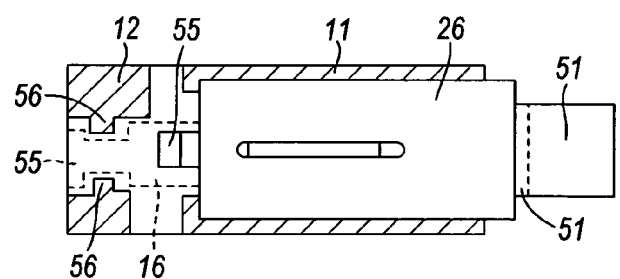

DISC BRAKE LOCKS

The invention relates to disc brake locks.

A known disc brake lock comprises a U-shaped body having first and second interconnected limbs defining a slot for receipt of an edge of a brake disc. The first limb includes a chamber containing an alarm system and a locking pin is provided that is movable between a locked position in which the pin extends across the slot and, in use, through a hole in the brake disc and in an inoperative position to allow the lock to released from the disc. The alarm system sounds an alarm if there is an attempt to tamper with the lock. In some embodiments the chamber includes an aperture closed by a removable cover through which the alarm system is inserted into the chamber. Since the first link contains the alarm system, it is deeper than the second limb. In use, therefore, the first limb is arranged between the disc and an associated wheel and the first limb is exposed on the outer surface of the disc. This means that the cover is exposed and is vulnerable to attack to disable the alarm system.

According to a first aspect of the invention, there is provided a disc brake lock comprising a U-shaped body having first and second interconnected limbs defining a slot for receipt of an edge of a brake disc, the first limb containing an alarm system and the second limb including an aperture closed by a removable cover through which the alarm system is inserted into the first limb, a locking pin being provided that is movable between a locked position in which the pin extends across the slot and, in use, through a hole in a brake disc, and an inoperative position to allow the lock to be released from the disc.

By inserting the alarm system through the second limb, greater security can be achieved.

According to a second aspect of the invention, there is provided a disc brake lock comprising a U-shaped body having first and second interconnected limbs defining a slot for receipt of an edge of a brake disc, the first limb including a chamber containing an alarm system, a locking pin being provided that is held by one limb to engage with the other limb to resist movement of the pin away from a locked position the pin being movable between the locked position in which the pin extends across the slot and, in use, through a hole in a brake disc into said engagement with said other limb, and an inoperative position to allow the lock to be released from the disc.

In other embodiments of the known disc brake lock, the pin is formed in multiple parts. This makes the pin weak to attach.

According to a third aspect of the invention, there is provided a disc brake lock comprising a U-shaped body having first and second interconnected limbs defining a slot for receipt of an edge of a brake disc, the first limb containing an alarm system, a locking pin being provided that is movable between a locked position in which the pin extends across the slot and, in use, through a hole in a brake disc, and an inoperative position to allow the lock to be released from the disc, the locking pin being held by one limb and being held against removal from said limb by engagement between the pin and the limb.

According to a fourth aspect in the invention, there is provided a wheellock combination in which the wheel carries a brake disc for rotation therewith and lying in a plane parallel to the plane of the wheel and to one side of said wheel plane, and a lock according to any one of the first, second and third aspects of the invention with the disc in the slot and the second limb located between the disc and the wheel, so preventing access to the cover.

The following is a more detailed description of an embodiment of the invention, by way of example, reference being made to the accompanying drawings in which:—

Figure 1B:
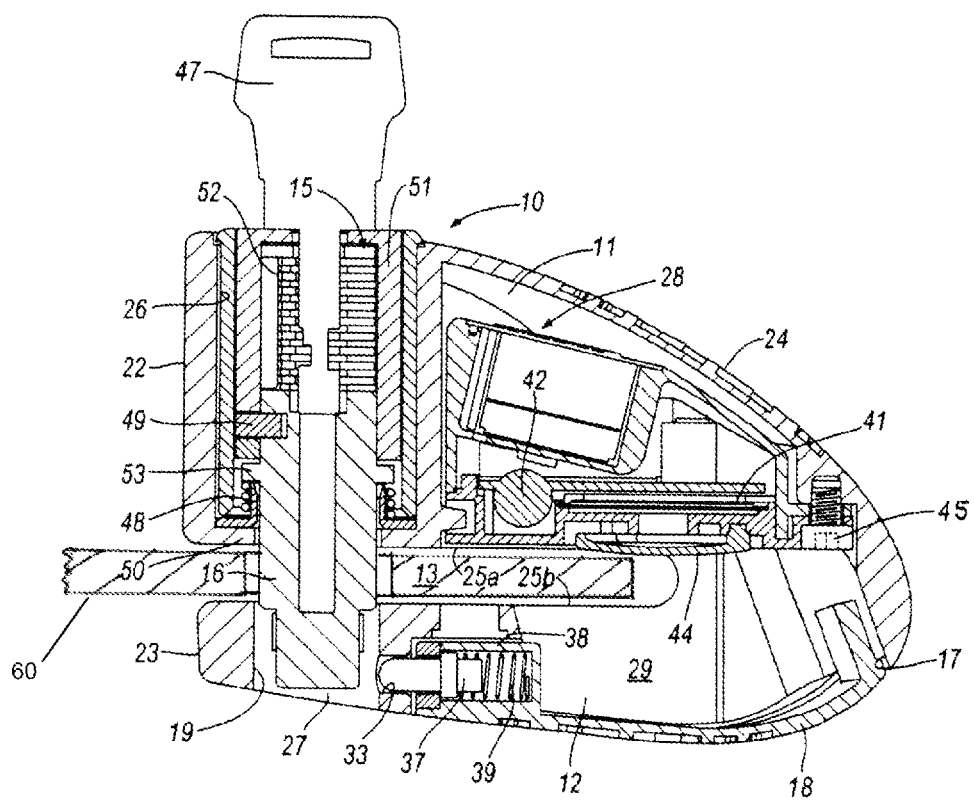
Figure 2:
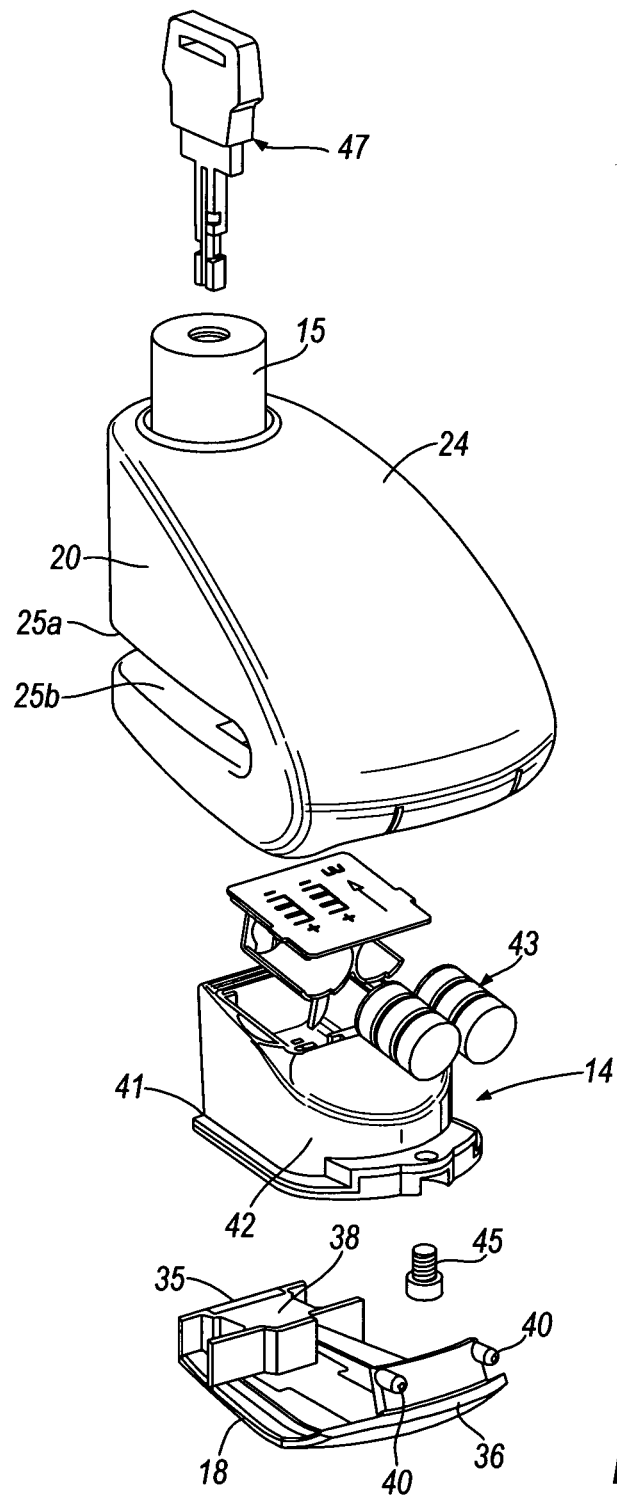

FIG. 1a shows an example wheel and disc to which a disc brake lock is attached, FIG. 1b is a cross section through a disc brake lock, FIG. 2 is an exploded view of the disc brake lock of FIG. 1 from above, and FIG. 3 is an exploded view of the disc brake lock of FIGS. 1 and 2 from beneath, and FIG. 4 is a sectional view through a cylinder lock and a co-operating hole of a second limb of the disc brake lock of FIGS. 1 to 3, a retracted position of a locking pin of the cylinder lock being shown in full line and an extended position being shown in broken line.

Referring to the Figures, the lock comprises a U-shaped body having first and second limbs 11, 12 defining a slot 13 therebetween. The first limb 11 contains an alarm system 14 and also carries a cylinder lock 15 and a locking pin 16. The second limb 12 has an aperture 17 closed by a removable cover 18. The second limb 12 also includes a receiver in the form of a hole 19 for receiving an end of the locking pin 16.

The body 10 may, for example, be formed of stainless steel. The body 10 is a single casting to provide the first and second limbs 11, 12. The body 10 has first and second U-shaped side walls 20, 21 that meet at one end at a rounded end 22 of the first limb 11 and a rounded end 23 of the second limb 12. A generally U-shaped top cover 24 extends between the outer edges of the first and second side walls 20, 21. The inner edges of the first and second side walls 20, 21 are connected by respective first and second parallel spaced inner wall surfaces 25a, 25b that define the slot 13.

The end of the first limb 11 is formed with a circular cross section tube 26 having an axis lying in a plane normal to the plane of the slot 13. The cylinder lock 15, which will be described in more detail below, is held in the tube 26. The locking pin 16 is co-axial with the cylinder lock 15 and in the operative position shown in FIG. 2, extends into the hole 19 that is co-axial with the tube 26.

The first limb 11 is thus formed with a first chamber 28 that is defined between the first and second sidewalls 20, 21, the top cover 24, the first inner wall surface 25a and the tube 26. The first chamber 28 is open around the base of the body 10 between the first and second limbs 11, 12 and leads into a second chamber 29 provided in the second limb 12. The second chamber is also defined between the first and second sidewalls 20, 21 the top cover 24 and the second inner wall surface 25b. The aperture 17 is formed in the top cover 24 over the second chamber 29, (see FIG. 3). The aperture 17 has a narrower end wall adjacent the hole 19 and a longer end wall 32 adjacent the base of the body 10. The narrower end wall 31 is provided with a passage 33 extending into the hole 19 in a direction normal to the axis of the hole 19. The purpose of this passage 33 will be described below.

The longer end wall 32 is provided with two spaced peg holes (not shown). The purpose of the peg holes will also be described below.

The removable cover 18 is generally rectangular and is sized to fit the aperture 17. The cover 18 has a shorter end edge 35 and a longer end edge 36. The shorter end edge 35 carries a releasable latch in the form of a pin 37 that projects from the shorter end edge 35 and can be retracted against the action of a spring 39 into a housing 38 provided on the cover 18. The longer end edge 36 carries a pair of projecting pegs 40 (see FIG. 3). The pegs 40 fit into the peg holes (not shown) and the cover 34 can then be swung into a position where the pin 37 is retracted by contact against the narrower end wall 31 of the aperture 17 before being urged by the spring 39 into the passage 33, as seen in FIG. 1. In this position, there is nothing on the first and second side walls 21 or the top cover 24 that allows the cover 18 to be removed. The importance of this will be described below.

The alarm system 14 comprises a mounting plate 41 that carries an electronics module 42 with a power supply 43. The electronics module 42 includes a contact plate that extends through a hole in the inner wall 25 (see FIG. 1). The alarm system 14 is of the type that provides an audible alarm when the alarm is set and the lock is moved. The details of the alarm system 14 are known and will not be described in any further detail.

The alarm system 14 is inserted into the body 10 through the aperture 17 with the cover 18 removed. It passes around the base of the body 10 until the alarm system 14 is received within the first chamber 28, as seen in FIG. 1. It is held in position by a screw 45 that extends through the mounting plate 41 and engages into a threaded aperture 46 in the top cover 24. After the alarm system 14 has been located and fixed, the cover 18 is replaced as described above.

The tube 26 that holds the cylinder lock 15 terminates at its inner end in an inwardly directed flange 50 defining a hole through which the locking pin 16 projects. A cylinder lock 15 has a barrel 51 that holds the locking pin 16 through part 49 and has a key operated locking mechanism 52. The barrel 51 is urged partially out of the body 10 (to the position shown in FIG. 2) by a spring 48 (see FIG. 1) acting between the flange 50 and an annular rib 53 on the locking pin 16.

When the barrel 51 is in the position shown in FIG. 2, the locking pin 16 is retracted into the tube 26 in the first limb 11. When the barrel 51 is depressed against the action of the spring 48, the locking pin 16 is moved across the gap 13 and into the hole 19 in the second limb 12. The locking pin 16 is formed with a T-shaped head 55 (FIG. 4) that passes two diametrically opposed lugs 56 projecting inwardly of the hole 19. Once past the lugs 56, rotation of the key 47 rotates the locking pin 16 until the arms of the T-shaped head 55 of the locking pin 16 engage behind the lugs 56, against which the head is held by the spring 48. In this way, the locking pin resists the lock being broken by forced separation of the first and second limbs 11, 12.

In addition, the locking pin 16 is shaped so that it cannot be pulled from the limb 11. This is an added security feature. Further, the locking pin 16 is made in one piece from machined steel so that it cannot be disassembled. This is a further security feature.

Moving the cylinder lock 15 to the operative position shown in FIG. 1 sets the alarm system 14. The reverse movement of the cylinder lock 15 back to the inoperative position seen in FIG. 3, disables the alarm system 14.

The lock described above with reference to the drawings is for use on the disc of a disc brake, usually the disc brake of a motorcycle. Such a brake comprises a disc that is carried by a wheel and is co-axial with the wheel and to one side of the wheel. The disc lies in a plane parallel to the plane of the wheel. The disc rotates with the wheel and cooperates with a calliper device that, on operation, clamps brake pads against the disc to slow or stop rotation of the wheel. The disc is provided with a number of angularly spaced holes inwardly of the outer edge of the disc.

In the example of FIGS. 1a and 1b an edge of a disc 60 is inserted into the slot 13 until the tube 26 and hole 27 are lined with a hole in the disc 60. The second limb 12 is between the wheel 62 and the disc 60 with the first limb 11, because of its size, on the outer side of the disc 60. It is not possible to orientate the lock in any other way, because the first limb 11 will not fit between the wheel 62 and the disc 60.

The cylinder lock 16 is then pressed inwardly to extend the locking pin 16 through the hole in the disc and into the hole 19 in the second limb 12. This locks the lock to the disc. In addition, it activates the alarm system 14.

In this disposition, there is no access to the alarm system 14. The first limb 11 presents an uninterrupted outer surface formed by the first and second side walls 20, 21 and the top cover 24. The only access is through the cover 18 which is located between the wheel and the disc and thus is not accessible.

Even, however, were the second limb 12 accessible, the cover 18 is not easily removed. The end of the pin 37 is not accessible in the passage 33 because the end of the passage 33 is covered by the end of the locking pin 16 as seen in FIG. 1. Only with the locking pin 16 retracted out of the hole 27, can the end of the pin 37 be accessed to depress the pin 37 against the action of the spring 39 so moving the pin 37 out of the passage 33 and allowing the cover 18 to be removed. This, therefore, provides a second level of protection.

If an attempt is made to interfere with the lock, the disc contacts the contact plate 44 to operate the alarm. Separation of the limbs 11, 12 is resisted by engagement of the head of the locking pin 16 with the hole 27 in the second limb 12, as described above. As also described above, the locking pin 16 cannot be pulled through the top of the lock and the locking pin 16 is formed in one piece. These features both increase significantly the security of the lock.

It will be appreciated that there are a number of changes that can be made to the arrangement described above with reference to the drawings. The use of the spring loaded pin 37 accessible only from the end of the passage 33 is optional. The cover 18 could be screwed to the body 10. This would not be as secure as the arrangement described above but would still provide the major benefit of having the alarm system 14 in a chamber 28 that is inaccessible when the lock is fitted to a disc. The pin 37 could, for example, be replaced by a ball or any suitable spring-loaded latch. The cylinder lock 15 could be replaced by an electronic lock. The body 10 need not be shaped as shown; it could have any suitable shape.

The invention claimed is:

1. A disc brake lock comprising:
a U-shaped body in the form of a single piece of material that includes first and second limbs cooperatively defining a slot configured to receive an edge of a brake disc;
the first limb including a first chamber containing an alarm system and the second limb including a second chamber leading to the first chamber and including an aperture closed by a removable cover through which the alarm system is inserted through the second chamber into the first chamber in the first limb; and
a locking pin provided in the first limb, and the second limb including a hole configured and arranged to receive the locking pin, the locking pin being movable between a locked position in which the locking pin extends across the slot defined by the first and second limbs through a hole in a brake disc positioned in the slot defined by the first and second limbs and engages the hole in the second limb, and an inoperative position in which the locking pin is retracted from the hole in the second limb and in which the lock is releasable from the brake disc.

2. A lock according to claim 1 wherein the cover is held closed by a retractable pin that at least partially resides in a passage that is open at one end, the retractable pin being configured and arranged for back-and-forth movement within the passage, and wherein when the locking pin is in said locked position, the locking pin covers the open end of the passage in which the retractable pin at least partially resides.

3. A lock according to claim 2 wherein, when the locking pin is in said inoperative position, the retractable pin is accessible to open the cover.

4. A lock according to claim 2 wherein the cover is hinged at one end to the second limb and carries the retractable pin at an opposite end, the retractable pin engaging the second limb when the cover closes the aperture.

5. A lock according to claim 2 wherein the retractable pin is inaccessible by way of the hole in the second limb when the locking pin is in the locked position.

6. A lock according to claim 2, wherein the retractable pin is a spring-loaded pin that is biased toward the open end of the passage by a spring that resides in the second limb.

7. A lock according to claim 1 wherein the first limb includes a first surface and the second limb includes a second surface, the first surface being spaced apart from the second surface and the first surface being parallel to the second surface, and the first surface and the second surface defining therebetween the slot.

8. A lock according to claim 7 wherein the first surface forms part of a chamber formed in the first limb and receiving the alarm system, the remainder of said chamber being formed by an unapertured wall.

9. A lock according to claim 8 wherein the alarm system is mounted on a base, the base being located in the chamber and fixed to the first limb.

10. A lock according to claim 9 wherein the alarm system is made operational on movement of the locking pin to the locked position and is made inoperative when the locking pin is moved to the inoperative position.

11. A lock according to claim 1 wherein the alarm system includes a power source.

12. A lock according to claim 1 wherein the locking pin is moved on operation of a key operated locking mechanism.

13. A wheel/lock combination in which the wheel carries a brake disc for rotation therewith and coaxial therewith and positioned to one side of said wheel, the lock being as claimed in claim 1 with the disc in the slot and the second limb located between the disc and the wheel, the disc thus preventing access to the cover.

\* \* \* \* \*